(12) United States Patent  
Abrams et al.

(10) Patent No.: US 8,261,335 B2  
(45) Date of Patent: Sep. 4, 2012

(54) METHOD AND SYSTEM FOR ONLINE IMAGE SECURITY

(75) Inventors: Edward Abrams, Worcester, MA (US); Edward M. Batchelder, Brookline, MA (US); Antonio L. Rodriguez, Newton, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 1408 days.

(21) Appl. No.: 11/678,319

(22) Filed: Feb. 23, 2007

(65) Prior Publication Data

US 2008/0209533 A1 Aug. 28, 2008

(51) Int. Cl.
*H04L 29/06* (2006.01)
(52) U.S. Cl. ............... 726/9; 726/2; 726/8; 726/26
(58) Field of Classification Search .......... 715/517; 726/2, 8, 9, 26
See application file for complete search history.

(56) References Cited

U.S. PATENT DOCUMENTS

2004/0250205 A1* 12/2004 Conning .................... 715/517
2007/0234410 A1* 10/2007 Geller ............................ 726/8

* cited by examiner

*Primary Examiner* — Jeffrey Pwu
*Assistant Examiner* — Michael D Anderson (57) ABSTRACT

An online application enables an end user to navigate to a web site, upload digital images, and to combine those images with words in a stylized template to create a user-generated story. A story is a web page, typically a collection of photos and words that are brought together by a stylized template that can be customized by the end user. Preferably, a given story is available from the site at a given location (at a URL) that may be private or public. A given story may be shared with other end users, published to other web sites or web logs, or maintained solely for one's own use. The invention also provides for multiple end users to collaborate to create a "shared" story.

14 Claims, 9 Drawing Sheets

METHOD AND SYSTEM FOR ONLINE IMAGE SECURITY

CROSS-REFERENCE TO RELATED APPLICATIONS

This application is related to the following commonly-owned applications:

U.S. Ser. No. 11/678,155, filed Feb. 23, 2007, titled "Method and system for online creation and publication of user-generated stories;"

U.S. Ser. No. 11/678,170, filed Feb. 23, 2007, titled "Method for initial layout of story elements in a user-generated online story;"

U.S. Ser. No. 11/678,232 filed Feb. 23, 2007, titled "Method for modifying an initial layout of story elements in a user-generated online story;"

U.S. Ser. No. 11/678,269, filed Feb. 23, 2007, titled "Method and system for online image transformation using an image URL application programming interface (API)."

COPYRIGHT STATEMENT

This application includes subject matter that is protected by copyright. All rights are reserved.

BACKGROUND OF THE INVENTION

1. Technical Field

The present invention relates generally to a web-based application for putting together photos and words with styled templates that can be customized by an author for the purpose of telling a story.

2. Background of the Related Art

Online sharing of digital photos is well-known in the prior art. In particular, commercial web sites (such as Ofoto, Shutterfly, Flickr and many others) offer end users the ability to upload and store digital photos and to secure those photos, e.g., using standard logon and/or password schemes. It is also well-known in the art to provide hosted services (such as Six Apart) that enable end users to publish their own web logs (blogs). Social networking sites (such as Friendster, MySpace, Facebook and others) combine photo sharing and blogging by providing tools and hosted services that enable end users to upload and store their digital photos, and to publish blogs in association with those photos. While current approaches provide some advantages, the prior art has not recognized that digital photos are often episodic in nature and, as such, they are best shared in the context of a story. The prior art does not provide adequate tools or services to enable end users to upload and composite their photos with text in a storybook (or scrapbook) manner. In addition, prior solutions do not afford multiple end users, each of whom may have captured some relevant aspect of a shared experience, to share their photos on a collaborative canvas.

There remains a need in the art to provide an easy-to-use, secure, scalable and highly available online application that enables end users to publish their photos and words in custom stories that can be accessed, shared and re-published.

The present invention solves this need.

BRIEF SUMMARY OF THE INVENTION

The present invention provides an online application that enables an end user to navigate to a web site, upload digital images, and to combine those images with words in a stylized template to create a user-generated story. In one embodiment, a story is a web page, typically a collection of photos and words that are brought together by a stylized template that can be customized by the end user. Preferably, a given end user-generated story is available from the site at a given location (at a URL) that may be private or public. Thus, a given story may be shared with other end users, published to other web sites or blogs, or maintained solely for one's own use. The invention also provides for multiple end users to collaborate to create a "shared" story.

In one embodiment, the application is made available from a web site on the publicly-routable Internet. An end user operating a client machine navigates to the site via a web browser. Using an upload tool (e.g., a browser plug-in), the user uploads digital photos to the site. To design the story, the end user then selects one of a set of style templates. In response, a server-side layout algorithm takes an unstructured set of photos identified by the end user and the selected template and provides an initial layout for the story. This initial layout is exported to the web browser and displayed as a web page. Using one or more of a set of client-side editing tools, the end user then creates a custom design comprising the photos and any text blocks that are added to the page. Thus, for example, using a drag and swap tool, the user may alter the positions of any photos and text blocks in the layout. As this tool is used (i.e., as a given client-side user interface gesture occurs), a server-side reflow algorithm dynamically changes the order and placement of the photos and text in the layout. In addition, the editing tools enable the end user to select and edit a given photo, e.g., resizing, rotating or adding a given visual effect, or to add new photos and text blocks as desired. When the end user is satisfied with the layout and content of the story, he or she may then select a publishing option. In this manner, the end user may take a given action, namely, publish the story to a community (other given users of the site), limit access to the page via privacy settings, announce the story via email, invite others to collaborate on the story, or publish the story to a blog or other site. The site may also include online tools to facilitate manufacture of one or more products (e.g., posters, books, e-cards, cards, and any other items on which the story (or portions thereof) may be incorporated.

A dynamic client-side interface affords end users with significant creative control over how their photos are displayed and integrated with text to create their customized visual stories. Using the initial layout algorithm, the system takes an arbitrary set of photos and text blocks, together with a user-selected layout (and, optionally, a theme), and generates an initial layout page that preserves the user's storyline. As the end user modifies (edits) the story, the reflow algorithm dynamically changes the display in (from the user's perspective) real time. In so doing, however, preferably the client side only exchanges small amounts of data with the server side so that the entire page does not have to be reloaded each time the end user performs a given UI gesture during the editing process.

According to another feature of the invention, the online application is scalable to large numbers of end users using a server-side infrastructure that includes an image transformation application engine loosely coupled to a back end filesystem and an associated database. The filesystem preferably just handles files, and security settings are enforced to ensure that images do not get served directly from the filesystem itself.

According to a feature of the present invention, when a story is written to HTML (i.e., as the web page exported to the client browser), preferably each photo of the story is associated with an image tag <IMG>, and the SRC attribute of that tag preferably has a given URL of the form: http://<imfe>/x-fetch/<image hash>.<ext>?PARAMLIST. This URL points to a server side image transformation application, and it also includes (i) an "image hash" that is a unique identifier for the photo, and (ii) a list of parameters that describe one or more image transformations. Thus, a portion of the URL itself functions as an application programming interface (API) to the image transformation engine. As will be seen, by incorporating image transformations within the URL itself (and by separating the transformation engine from the database storage via a filesystem), the system can perform image manipulations directly at the entry to or exit from the site (i.e., as photos are received in or served from the site). This feature obviates storage of multiple versions of a given photo, which significant reduces storage cost.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
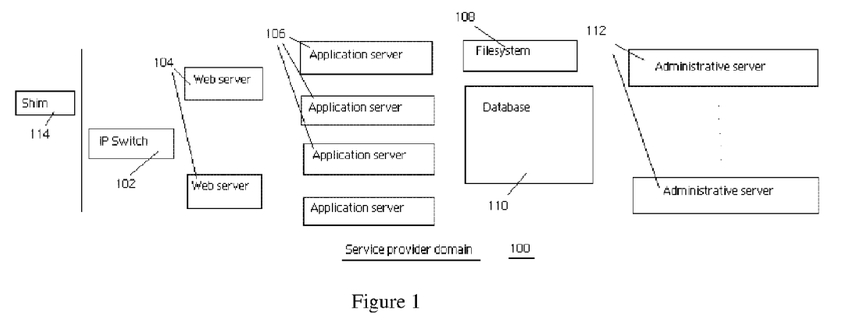
FIG. 1 is a simplified block diagram of the basic components of a server side architecture for use in the present invention.

FIG. 1 illustrates representative system architecture for use in implementing the present invention. The architecture is implemented in or across one or more Internet accessible data centers as a web site (typically, a set of web pages) together with associated applications running behind the site. End users operate Internet-accessible devices (e.g., desktop computers, notebook computers, Internet-enabled mobile devices, cellphones having rendering engines, or the like) that are capable of accessing and interacting with the site. An end user machine has a web browser or other rendering engine that is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. An end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). Although connectivity via the publicly-routed Internet is typical, the end user may connect to the system in any manner over any local area, wide area, wireless, wired, private or other dedicated network. As seen in FIG. 1, the "server side" of the system 100 preferably comprises an IP switch 102, a set of web servers 104, a set of application servers 106, a filesystem 108, a database 110, and one or more administrative servers 112. A representative web server is Apache (2.0 or higher) that executes on a commodity machine (e.g., an Intel-based processor running Linux 2.4.x or higher). An application server executes the image handling and transformation applications (including image layout and reflow), as will be described below. The filesystem 108 preferably is an application level distributed system that operates across a number of servers using an HTTP interface. As also described below, the filesystem provides an expandable, highly-available storage, which may be scaled as necessary. The database 110 may be implemented using MySQL (4.1 or higher), or any other convenient system. The administrator servers 112 handle other back end processes that are used at the site or otherwise to facilitate the service; these back end processes including, for example, user registration, billing, administration, and interoperability with third party sites and systems as may be required. As also seen in FIG. 1, the system includes client side code 114 (an AJAX shim) that executes natively in the end user's web browser or other rendering engine. Typically, this code is served to the client machine when the end user accesses the site, although in the alternative it may be resident on the client machine persistently. Further details of the server side architecture are provided in FIG. 12.

Figure 2:
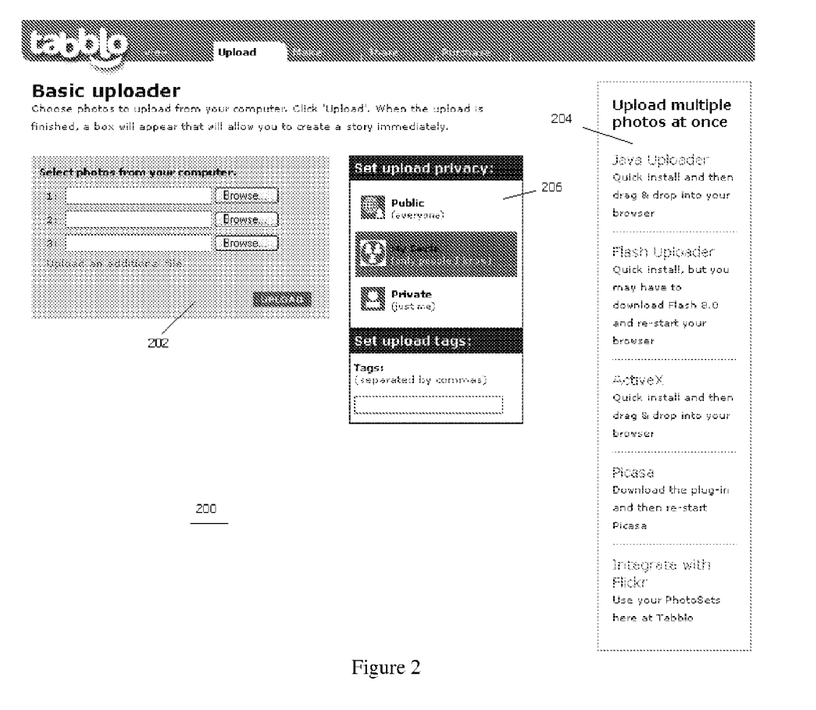
FIG. 2 illustrates an upload page from which an end user can import digital images to the system.

As noted above, in a typical use scenario an end user operating a client machine navigates to the site's home page via a web browser. Upon selecting an Upload display tab from a navigation bar, an upload page is displayed. FIG. 2 is representative. The name "tabblo" is a service mark of Tabblo, Inc. Preferably, the page 200 affords the end user a number of tools for use in uploading photos. These include, for example, a local file search and upload tool 202, as well as navigation bar 204 from which the end user can select for download one or more other upload tools such as: a Java uploader, a Flash uploader, an ActiveX uploader, or plug-ins to enable integration with other photo sharing tools or sites (e.g., Picaso and Flickr). The page 200 also preferably includes a display panel 206 through which the end user sets an upload privacy, e.g., public, a "circle" of authorized viewers, or private. The panel preferably also includes an input form by which the user can identify one or more upload tags for the story; the system uses these tags to identify the story to one or more search processes.

Figure 3:
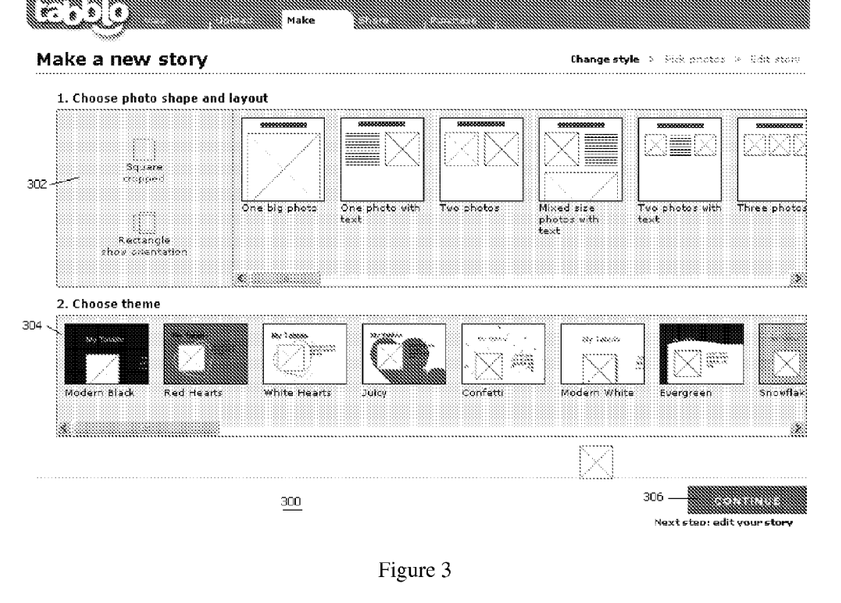
FIG. 3 illustrates a page from which an end user can begin the process of creating a tableau by selecting a layout and theme.
Figure 4:
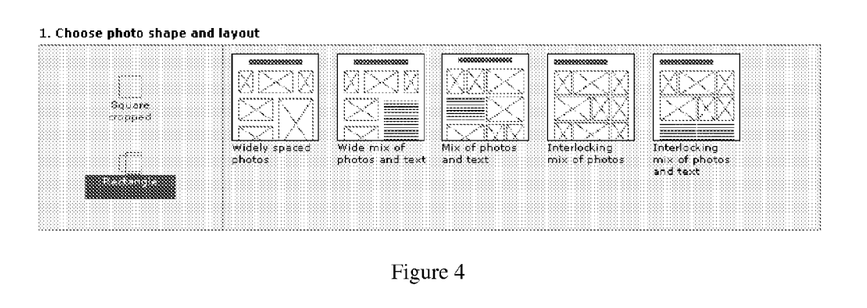
FIG. 4 illustrates a portion of the display of FIG. 3 after the user selects a rectangle-based layout option.
Figure 5:
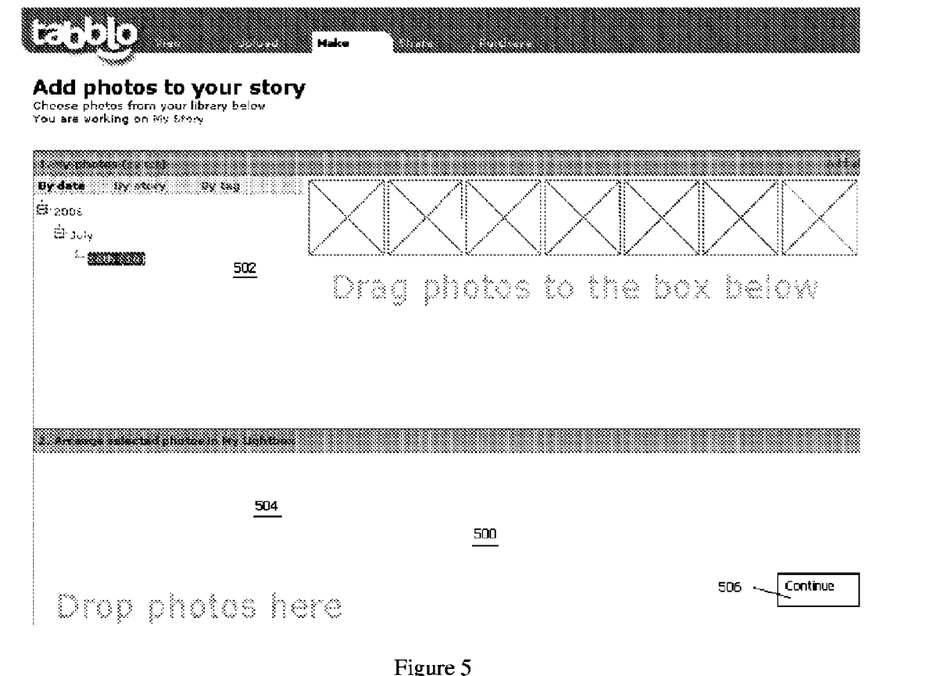
FIG. 5 illustrates a page by which the user can add photos to a selected layout.

Once the images are uploaded to the system, the end user begins the process of creating a visual storyboard by navigating to a Make display tab and selecting a link to create a new story. As a result, a "Make" page is displayed, as illustrated in FIG. 3. As can be seen, page 300 includes a first "choose photo shape and layout" section 302, and a second "choose theme" section 304. Within the first section 302, the user can select one of a set of "square" layout options (such as shown in FIG. 3); alternatively, he or she can select one of a set of "rectangle" layout options. FIG. 4 illustrates a portion of the display of FIG. 3 after the user selects a rectangle-based layout option. Referring back to FIG. 3, a desired display theme (e.g., background, colors, and the like) is selected from the "choose theme" section 304. Upon selecting the desired layout and theme, the user selects the Continue button 306. In response, the system preferably displays an "add photos" page 500, such as illustrated in FIG. 5. The page 500 preferably includes a first section 502 in which the user's uploaded photos are positioned. The end user then selects which of the photos are to be included in a given story, e.g., by dragging and dropping the selected photos from the first section 502 to a second section 504, which is a holding area. After the photos are selected for the holding area, the user selects the Continue button 506 to continue the process of creating the story.

Figure 6:
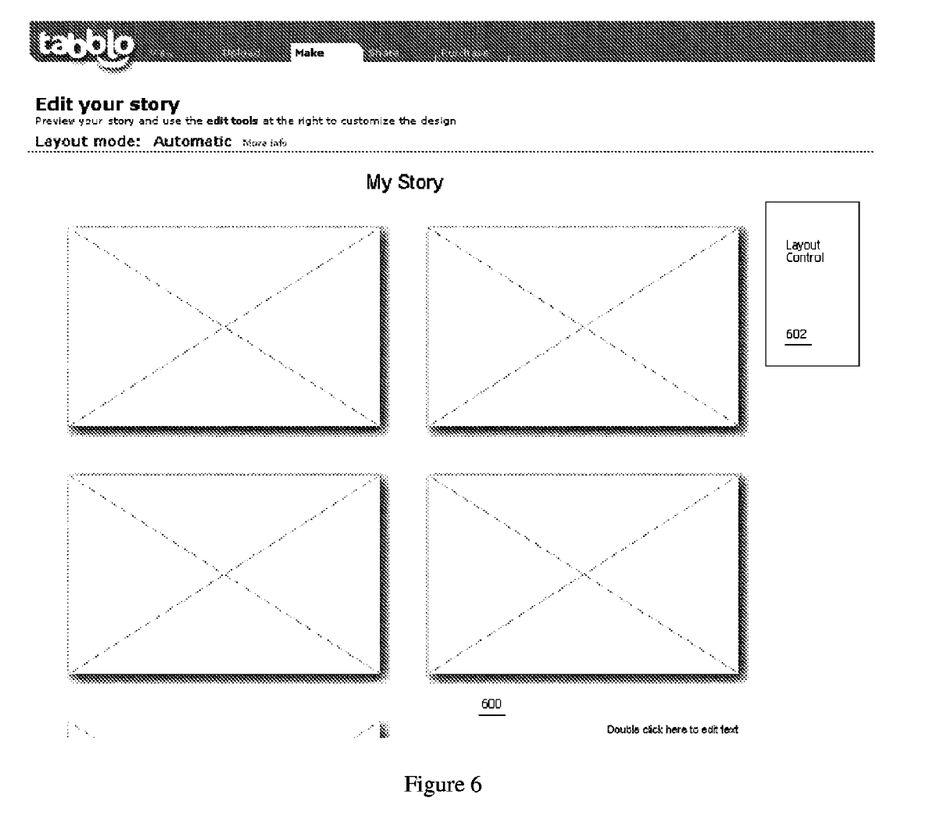
FIG. 6 illustrates an "edit" page showing the initial layout of the story under development.
Figure 7:
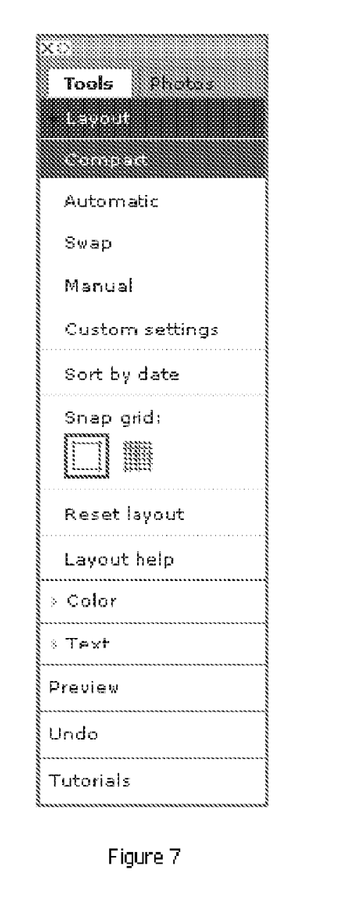
FIG. 7 illustrates a layout control that can be used to effect further edits of the story.

As will be described in more detail below, upon selecting the Continue button on page 500, a server side process executes an initial layout algorithm, which takes the unstructured set of photos identified by the end user (from the page 500) and the selected (square or rectangle-based) template and theme (from the Make page 300) and, in response, provides an initial layout for the story. A resulting "initial" layout for the story under development in this example is shown in the "edit" page 600 of FIG. 6. As seen in FIG. 6, the edit page preferably includes a layout control 602, which provides the user with varying degrees of control over a layout mode. Depending on the mode selected, the system provides the user with a very hands-on experience, a highly automated experience, or somewhere in between. FIG. 7 illustrates a representative layout control 700. By selecting one or more operations from the layout control menu, various operating modes are entered, as now described. As will be described in more detail below, these operating modes are enabled via a server-side reflow algorithm. The reflow algorithm also takes advantage of the AJAX-enabled client shim so that, as a result, the story page generation is made to feel more responsive to the end user. As previously noted, the use of an AJAX-enable client enables the client side to exchange small amounts of data with the server side (running the reflow algorithm) so that the entire page does not have to be reloaded each time the end user performs a given UI gesture during the layout process.

Figure 8:
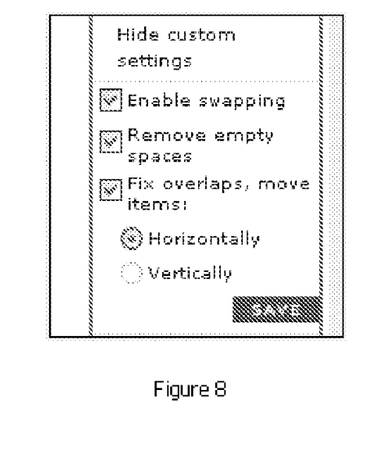
FIG. 8 illustrates the custom settings that may be selected from the layout control of FIG. 7.

In particular, and with reference to FIG. 7, in a compact mode, after every change made by the user, the system preferably rearranges the photos and text to fix any overlapping items and to remove any empty blocks of space. In general, this is accomplished by shuffling items in a right-and-left fashion. In this operation, the swap function (described below) is also enabled. In an automatic mode, after every change made by the user, the system preferably rearranges the photos and text so that no items overlap but also keeps any empty blocks of space. This is accomplished by pushing items lower down the page, as will be described. Once again, in this operation the Swap function is enabled. The swap function is a mostly manual mode. In particular, when the user moves a photo or a text block on top of another item in the story, preferably the two items will trade places or "swap." Other than this switch, the system preferably does not make any other changes to the user's layout. In a manual mode, the user has full control (i.e., the system does not make any automatic changes as the user moves his or her items around the layout). This mode can be useful for putting a text block on top of an image, or the like. FIG. 8 illustrates a set of custom settings that may be selected from the layout control when the user has selected the manual mode. In particular, these controls include checkboxes to enable swapping, to remove empty spaces, and to fix overlaps or move items (either horizontally or vertically as selected by the radio buttons). Referring back to FIG. 7, a snap grid control provides either a coarse grid (as shown in FIG. 6) or a fine grid, with the images in close proximity.

Figure 9:
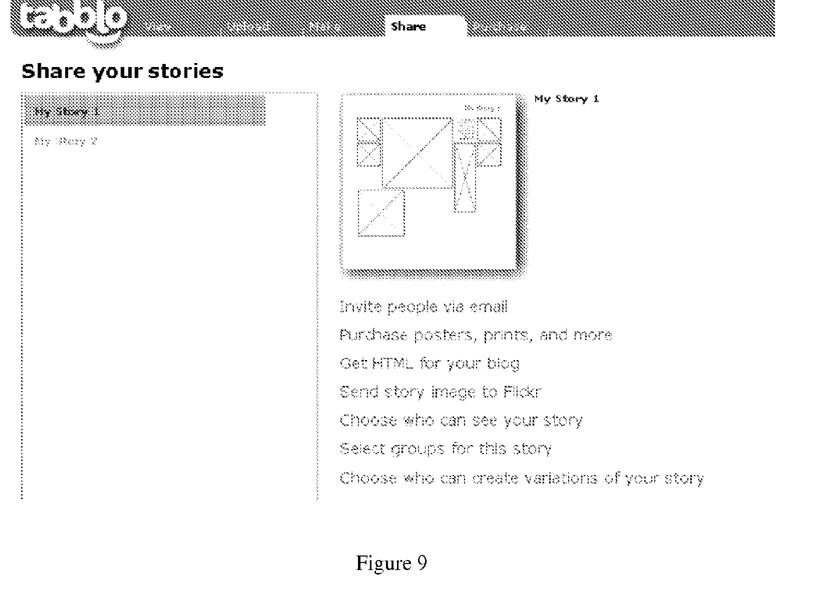
FIG. 9 illustrates a display page from which the user can publish his or her story.

When the end user is satisfied with the layout and content of the story, he or she then selects a publishing option. Preferably, this is achieved by having the user navigate to a Share page 900 such as illustrated in FIG. 9. From this page, the user can select a story and a publication option, such as, without limitation: inviting others (via email) to view the story, purchasing products (e.g., posters, prints, books, and the like), obtaining HTML to publish the story to a web log, sending the story image to a third party site, selecting who can view the story, selecting groups that may view the story, and selecting others who the user authorizes to create variations of the story, e.g., in a collaboration. With respect to collaboration, preferably the site provides several different types of options. In particular, in one embodiment, the site implements a multi-source single author collaboration model. For example, in this model, and based on access controls explicitly granted or implicitly granted by being in someone's "circle" (social network), user A can include content (that has been uploaded by user B) in user A's own work. Additionally, should user B decide that user A should no longer have access to the content user A has borrowed from user B, with one simple access control change user B can suppress the content from all of the products (online or otherwise) that user A has used the content. Additionally, this model supports a "variations" feature that allows user A to make a completed product (online, book, poster, or the like) available for "variation access" to any number of selected users, a feature that effectively allows these users to begin creating content not from scratch but, rather, from user A's finished product (i.e., a given story or some portion thereof). This variations feature effectively allows a first end user to start from where another end user leaves off. In another embodiment, the site implements a multi-source, multi-author collaborative model. In this latter model, and once again based on access controls, multiple users can contribute content and also concurrently edit the same story product. This is achieved by having one user (user A) take ownership of the story and then open up specific "editable areas" that will each carry with them edit access control for one or more specifically designated users. Thus, for example, this collaboration model is used for allowing users A, B, and C to edit specific page ranges in a school yearbook.

The story generation process as described above should not be taken as limiting. There is no requirement that the end user go through a set of predefined display screens to create a story. In an alternative embodiment, the user simply navigates his or her browser to a given page, and then he or she uploads, imports and/or otherwise selects photos (preferably in a user-defined sequence or order). The system may then take the photos, select a given layout (from a set of one or more system layouts) and generates the initial layout automatically (i.e., without the user selecting a given layout, a theme, or both). In other words, the layout selection may be performed automatically by the system and not necessarily in response to an end user action. Indeed, no particular sequence of events (upload, product selection, layout selection, theme selection, and the like) is required or dictated by the system in general or the user interface in particular. Any particular sequence can be practiced.

The client shim provides the end user with a set of one or more client-side editing tools. These edit tools include, for example, pan and zoom (to enable scaling and re-centering), apply effects (to enable rotation, black and white, sepia conversion, negative, and the like), expand and collapse, and the like. A given tool is selected by the end user right-clicking on the image, which action preferably opens an editing tool bar in association with the photo. Icons in the tool bar are then selected for the one or more functions. When the end user performs a given edit, the client side shim communicates with the server back end (and, in particular, with an image transformation engine, as will be described). The actual image transformation(s) are carried out on the server side but, as will be seen, the system itself only needs to persistently store the image itself. In other words, it is not required to store the multiple versions of the image that are created by applying the one or more image transformations.

The above has provided a description of the system from the end user's perspective during the process of creating and publishing an online story. The following section provides additional details regarding how the system provides the layout and rendering functions. As used herein, a story is composed of a number of "elements" positioned on a grid. A grid is an underlying coordinate system on which all elements comprising the story are placed. As illustrated in FIG. 3, in some grids, the grid units are squares. As illustrated in FIG. 4, in other grids, the grid units are rectangular. If desired, combinations of square and rectangular grid units may be utilized. A given template may have a number of different grids of different coarseness, but preferably the initial layout of a template is done on a coarse grid. Grids preferably are laid out by analogy to a city block and street model; in particular, grid units are separated from each other by streets. As will be seen, a given story element can cover a single grid unit, or it can cover multiple units in each direction. If a story element covers more than one unit, then it may also cover the streets between grid units. Preferably, an element only covers a street if it also covers the units on either side of the street. Dimensions of grids are specified within the system in pixels. When stories are rendered onto a display screen, the pixels are literally the screen pixels. In other renderings (for example, to PDF format for printing), a virtual pixel coordinate system is used. In some grids, the street width is zero, which means that the grid units abut directly. In these grids, a fake margin width can be defined so that elements do not abut each other. As will be described below, the initial layout and reflow algorithms preferably use the fake margin to achieve the effect of the streets (elements have a consistent amount of space separating them), while allowing more flexibility in the placement of elements. Grids have a grid width, which is defined as a maximum number of columns. This width dimension enables online stories to fit within a reasonable screen width while still being able to grow vertically to accommodate as many photos as the user desires. In its full generality, a grid is defined by a number of attributes: (i) a block size, represented by a height and width in pixels of a single grid unit; (ii) an in margin, which represents a width of the streets in pixels; (iii) a fake margin, which represents a number of grid units to reserve between automatically-placed elements, and (iv) a grid width, measured in grid units. If the in margin is zero, then the fake margin is non-zero, and vice-versa. In desired, the in margin may be different for vertical streets as opposed to horizontal streets.

Although not meant to be limiting, preferably a rectangular grid unit in the system is sized so as to provide a $1:\sqrt{2}$ aspect ratio (the ratio of width to height) when a given photo is displayed in a layout that includes rectangular grid units. This aspect ratio ensures that the system provides consistent display of photos regardless of their orientation (portrait or landscape).

Figure 10:
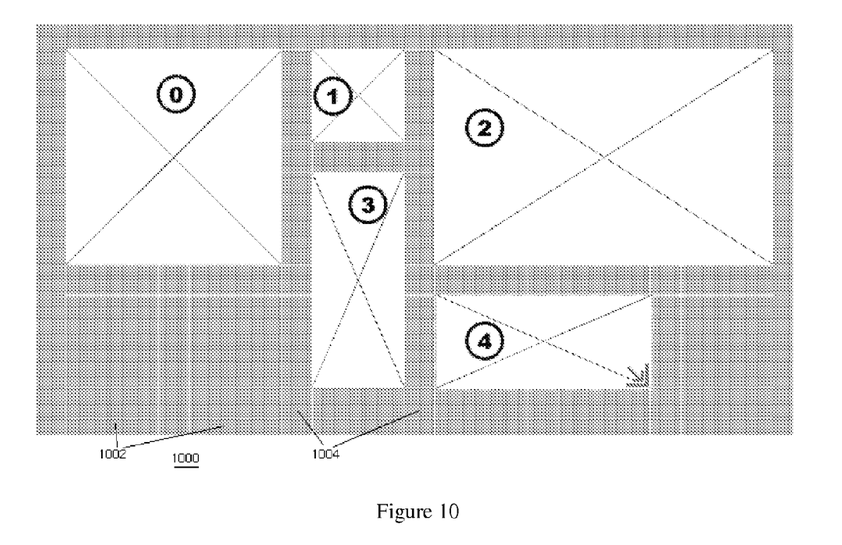
FIG. 10 illustrates a representative story having a set of photo elements.

A story element is one of a number of types of content. For online stories, typically a story element is a photo or a text box, but this is not a limitation of the system. An element may also be an external piece of content (such as a Google® map), an interactive component (e.g., a list of persons within a circle), a graphic, and so on. Elements are placed on a grid by specifying their x and y position (i.e., posx and posy) and size (width and height), the latter preferably in whole (integer) grid units. The values posx and posy preferably are the column number and row number of an upper-left grid unit covered by the element, both starting with zero. Preferably, within the system elements also have a sequential ordering (order) that is used externally for displaying a slideshow of the photos in a story, and internally for the reflow algorithm, as described below. FIG. 10 illustrates a representative online story that has been generated (according to the steps previously described) by an end user uploading photos, and then organizing the photos within a selected template and theme. As can be seen, this particular story has five elements, all photos, labeled with their order (from 0-4). In this example, the grid 1000 as drawn in has six columns, with 90-pixel grid units 1002 separated by 30-pixel streets 1004. The first photo (order 0) is at position (0, 0) and has size (in grid units) of (2, 2). The second photo (order 1) is at position (2, 0) and has size (1, 1). The third photo (order 2) is at position (3, 0) and has size (3, 2). The fourth photo (order 3) is at position (2, 1) and has size (1, 2). Finally, the fifth photo (order 4) is at position (3, 2) and has size (2, 1). The order is determined by the reading order of the upper left corner of the photo, which is why photo 3 comes after photo 2.

Preferably, the system uses one or more grid designs to specify all (or substantially all) aspects of the appearance of a story, from colors and type specifications to the grids and initial positions of story items. A grid design typically is constructed by combining the templates and customizations specified by a story, which include: a layout template, a theme template, story customizations, and any page customizations. In addition, the actual appearance of an element can be changed by information within the element. For example, the type face used for a text block can be set in a template, in a story-wide customization, in a per-page customization, or in the text block itself. Templates are named grid designs presented to the user as layout and theme choices. In particular, in the user interface (as shown in FIG. 3), templates are divided into layouts and themes; internally, however, preferably any of the settings can be stored in any template. In a representative embodiment, a given story is associated with two (2) template identifiers, one for the selected layout, and one for the selected theme. Of course, default layouts and/or themes may be used.

With the above as background, the following provides additional details of how the initial layout and reflow algorithms work in one embodiment.

Initial Layout

Generally, the initial layout algorithm takes an arbitrary set of elements (e.g., photos, text blocks, or some combination), a template and a theme, and it produces an initial layout for the story. The initial layout algorithm preferably is also used when re-laying out a story, e.g., when the user changes styles and/or chooses a new layout. Preferably, there are two (2)

basic approaches of the initial layout algorithm: simple layout, and component-based layout. The simple layout approach is most useful when the end user has selected a template with square elements. In the simple layout, a template specifies a list of one or more molds, each of which is used to position a photo. In particular, preferably a mold specifies a position and a size, both expressed in grid units, and a type, typically either photo or text block. Thus, a given mold may be a photo mold, or a text block mold. (It may be desirable to provide a combination mold). A mold "list" preferably comprises, for a given layout, a fixed initial part, and then a repeating part, which is repeated as needed to fill the mold. The initial part of a given mold may be empty, e.g., for layouts that use a simple repeating pattern. To lay out an online story using a simple layout, preferably the one or more molds (each of which has an associated mold list) and photo list (and text blocks, if any) are paired together. In particular, as noted each photo mold specifies the position and size of a next photo in the photo list. When a text-type mold is encountered, if there is a list of text blocks to layout, a next text block is placed. If there is not a list of text blocks, an empty text block (which may include "double-click here to enter text") may be placed in the layout. The process continues until the list of photos and text blocks is exhausted. In this manner, an online story can grow as long as it needs to use all the photos and text. Physical products (such as a poster) may have a fixed length, in which case the process ends when the bottom (or an end) of the poster (or other item) is reached, in which case all unused photos and text blocks are placed back in a holding area.

Figure 11:
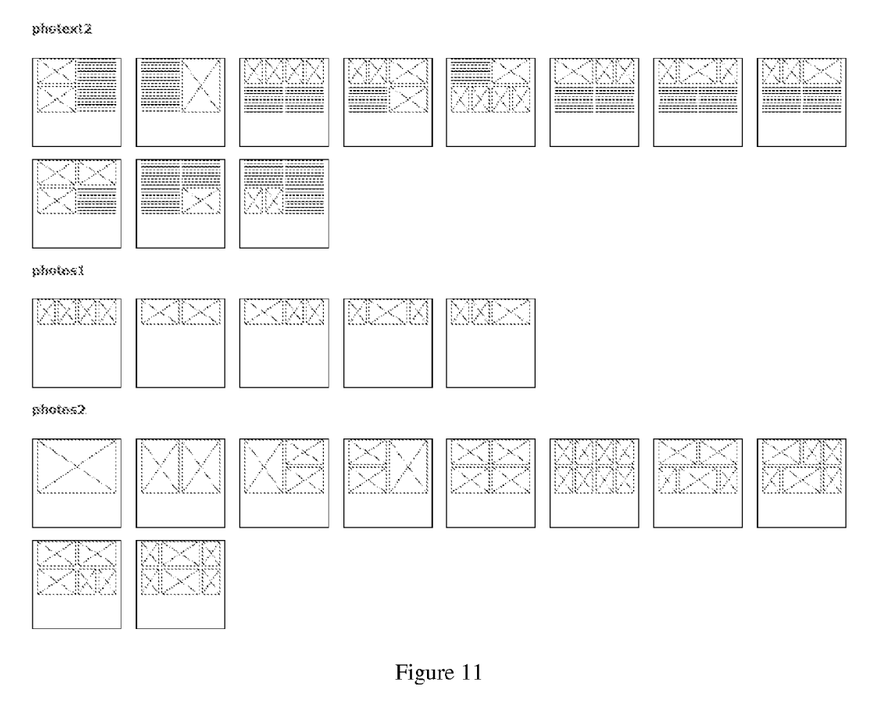
FIG. 11 illustrates various mold components that are grouped together into named sets for use by the initial layout algorithm.

Because a simple layout specifies the precise size and position of photos or text blocks, it is not efficient for laying out rectangular elements where orientation (such as, with respect to photos, portrait or landscape) has to be honored. In a component layout, preferably the template specifies the positioning of photos with a two-tier arrangement. In particular, preferably the template specifies a series of blocks, each of which is filled with a mini-layout called a component. Typically, a block is collection of grid units. The choice of component is determined by the block and by the orientations of the photos to be placed. In this way, the order and orientation of the photos is preserved, and the designer of the template can exert some control over the layout. A component is a list of molds, just as described above with respect to the simple layout templates. Preferably, components are grouped together (internally, i.e., within the system) into named sets (for example, photext1, photos1, photos2) according to a designer's wishes. FIG. 11 illustrates representative groupings. The square outlines shown in FIG. 11 are merely for illustration purposes and are not part of the grouping. Thus, one named set (e.g., photos1) comprises short layouts (1 grid unit high) tightly packed with photos, while another named set (photos2) comprises 2 grid unit high layouts also tightly packed with photos. Yet another representative set (e.g., photext2) comprises 2 grid unit high layouts with tightly placed photos and text. Another named set (e.g., photext1), although not shown, comprises 1 grid unit high layouts with and loosely packed photos and text. A "phosparse1" named set comprises a loosely packed set of photos each of which are 1 grid unit high, while a "phosparse2" named set comprises a loosely packed set of photos that are each 2 grid units high, and so on. The system may include as many different components and sets of components as desired. The naming conventions, of course, are not meant to be limiting. Typically, the components within each set differ as to how many photos, and what orientations of photos, they layout. A component-based template specifies a list of blocks. As in simple layouts, preferably the list of blocks has an initial part used once at the start of the story, and then a repeating part which is used over and over to provide a layout as long as is needed. Moreover, preferably each block also specifies a number of photos to use in the block, and a component set to choose a component from. For example, a block list might be defined as follows:

6:photext2|4:photos1|3:photext2|–|6:phosparse2|4:photos1

Preferably, the system includes an arbitrary set of block lists. In this example, as can be seen this block list specifies an initial part with three (3) blocks, and a repeating part with two (2) blocks. Blocks are concatenated, as indicated by the concatenation operators. A hyphen separates the initial part from the repeating part. The blocks specify six (6) photos placed in a photext2 component, 4 photos placed in a photos1 component, 3 photos placed in a photext2 component, 6 photos placed in a phosparse2 component, and 4 photos placed in a photos1 component.

To layout the story, the blocks in the block list are considered in turn by the initial layout algorithm. In particular, the photo count from the block is used to examine the next photos from the photo list. Using this example above, the first block specifies six photos, so the algorithm looks at the first six photos in the photo list and collects their orientations. The orientations are used to choose a component. Thus, assume that the six photos (as selected by the end user) are all portrait orientation except for one, so the orientations may be notated as PLPPPP. The block specifies a component set (in this example, photext2). To find the component to use, the initial layout algorithm takes a name of the component set (e.g., photext2) and the orientations of the photos (in this case, PLPPPP), and determines if there is a component in the component set which lays out six photos in the desired orientations. If there is not a component like that, the algorithm preferably omits a photo (e.g., the last one) and tries again, in this case looking for a photext2 component that lays out five photos PLPPP. This process of reducing the list of photos and examining the component set for a matching component continues until a match is found. Each time the list of photos is reduced by one, the dropped photo is returned to the photo list so that it will be used as part of a next block.

A component set may have more than one component for the same orientations. In this case, preferably one of the matches is chosen at random, although a deterministic scheme may be used as well. Preferably, the system designer provides sufficient components (e.g., by always specifying at least a portrait component and a landscape component) so as to ensure that a match is always found. Once a matching component is found, it is used to layout the photos and text, just as in the simple layout. In particular, the positions specified in the component are interpreted relative to the position of the block. After positioning the photos in a block, the process repeats, beginning with the next photos in the photo list. As with simple layout, an online story can be arbitrarily long, with the laying out continuing until the list of photos and text are exhausted. As noted above, some products (such as a poster, or a book) have a fixed length, in which case preferably the process stops when the product is full, and the remaining photos and text are put back into the holding area.

Reflow

The reflow algorithm preferably is used when the user changes the positions or sizes of elements in a story. This algorithm, which executes on the server side but takes advantage of AJAX-enabled client side technologies, is used to enforce one or more rules about the layout. These rules include, for example, that the layout should not include extra space, that elements should not overlap, and the like. In general, the reflow algorithm operates as follows: based on certain settings, elements within the story are moved to satisfy a rule and, in particular, by adjusting the position of one or more elements that are later in the element order (i.e., that have a higher ordinal position). As will be seen, this effect may cascade in the sense that, once an element is moved, that movement may cause adjustments to elements later in the element order to guarantee that all the desired rules are satisfied. As used herein, the reflow algorithm works in conjunction with the following attributes: collision, and whitespace. A collision occurs when two elements both overlap the same grid unit. A grid unit is considered to be whitespace if no element overlaps that grid unit. The reflow algorithm preferably works in different ways, based on the user's choice of layout mode. In particular, preferably these options change both which rules are enforced, and the strategies used to enforce them. Thus, for example, collisions are fixed by reflowing elements to the right (Reflow_Collisions), by pushing elements down (Push_Collisions), or by ignoring them entirely (Ignore_Collisions). Whitespace can be collapsed (Collapse_Whitespace), or it can be left in place (Leave_Whitespace). As illustrated in FIGS. 7 and 8, the user interface presents one or more of these options to the user, each of which then determines choices of strategy: Compact: Collapse_Whitespace, Reflow_Collisions; Automatic: Leave_Whitespace, Push_Collisions; Swap: Leave_Whitespace, Ignore_Collisions; Manual: Leave_Whitespace, Ignore_Collisions; Custom settings: allows the user to choose the strategies explicitly. It is not required that all combinations of these strategies be implemented of course. Thus, for example, it may not be required for the algorithm to handle the situation where both Collapse_Whitespace and Push_Collision are chosen. One of ordinary skill in the art will also appreciate that when Leave_Whitespace and Ignore_Collisions are chosen, then no reflowing is needed.

In one representative embodiment, there are four (4) basic operations: (1) Collapse_Whitespace, Ignore_Collisions; (ii) Collapse_Whitespace, Reflow_Collisions; (iii) Leave_Whitespace, Reflow_Collisions; (iv) Leave_Whitespace, Push_Collisions. The reflow algorithm preferably uses a set of functions. The functions include an AVOID_COLUMN_OVERFLOW function, an AVOID_COLLISION_REFLOW function, and an AVOID_COLLISION_DOWN. The AVOID_COLUMN_OVERFLOW function checks if an element is so far to the right that it is not fully contained within the grid width and, if so, the element is moved to the beginning of the next row in the grid:
  if the posx of the element plus the width of the element is
    >=the grid width then the element 'overflows' the grid:
    reset the element's posx to 0
    increment its posy by 1
    (together these move it one row further down the page, against the left edge)
The AVOID_COLLISION_REFLOW function checks if the element overlaps with any other element and, if so, moves it to the right to avoid the collision:
  if the element E overlaps with any another element F:
    increment its posx so that it is one greater than (F.posx+F.width+fake margin), positioning it just to the right of F.
The AVOID_COLLISION_DOWN function checks if the element overlaps with any other element and, if so, moves it down to avoid the collision:
  if the element E overlaps with another element F:
    increment its posy so that it is one greater than (F.posy+F.height+fake margin), positioning it just below F.

In one embodiment, the reflow algorithm works as follows below. Preferably, the algorithm is implemented in software, as a set of processor-executable instructions. The algorithm removes all elements from the story (i.e., from a current web page representation) while remembering their original position. Then, the algorithm considers each element in turn and places the elements back onto the grid, using the (user-selected or system-selected) chosen strategies to fix violations of the rules as it goes:
  iterate the elements in their ordinal position order; for each element E:
    pick a new position for E:
      if Collapse_Whitespace, the new position is the first empty grid unit in the grid
      else, the new position is E's original position.
    place the element E at its new position
    AVOID_COLUMN_OVERFLOW on E
    if Reflow_Collisions:
      AVOID_COLLISION_REFLOW on E
      AVOID_COLUMN_OVERFLOW on E (again, since previous step could have moved E to the right).
    else if Push_Collisions:
      AVOID_COLLISION_DOWN on E As noted above, preferably the above algorithm executes on the server side. Nevertheless, because the client preferably is AJAX-enabled, only small amounts of data need to be transmitted between the client and server as a result of a given UI gesture (moving a photo from a first position to a second position, inserting a textbox, or the like) on the client side. In response, the server returns a JSON data structure detailing, for each element in the story, what its new position is. Then, the client can simply move the elements to their new positions (using conventional AJAX-enabled functions). Thus, in effect, the reflow algorithm redraws the layout as a new web page "on the fly" using the algorithm described above. From the end user's perspective, the resulting layout appears to be edited in real-time as photos and text blocks are seamlessly moved about the layout to facilitate the storyboarding process.

While the reflow algorithm has been described in one embodiment, one of ordinary skill will appreciate that one or more variants to the algorithm may be practiced. Thus, for example, the algorithm could be modified so that it is executed (in a forward or reverse direction) from some particular location in the page.

Site Infrastructure

Figure 12:
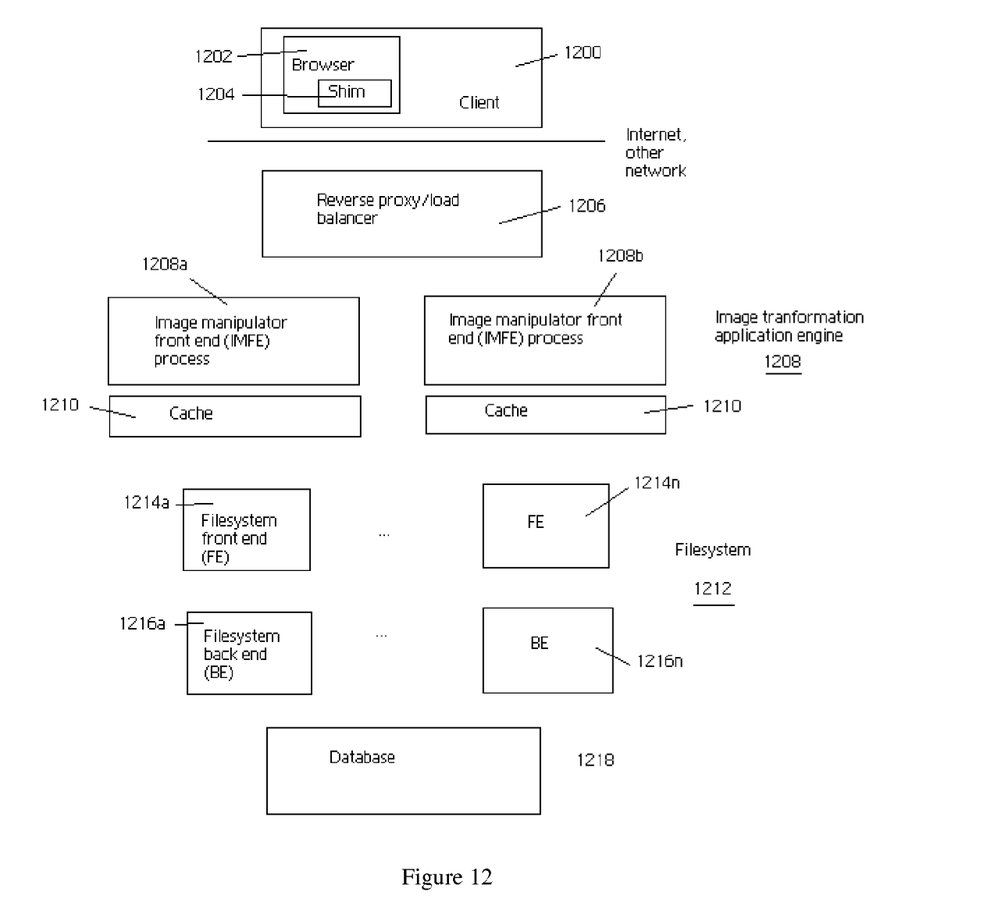
FIG. 12 illustrates a preferred embodiment of the server side architecture for the site.

FIG. 12 illustrates a preferred embodiment of the server side architecture of the site. It is not required that the components be located within the same data center. As will be seen, the site preferably comprises a set of machines that execute a set of processes. A client device 1200 running a browser 1202 connects to the site over the public Internet, or via any other convenient communication link. The browser includes an AJAX client shim 1204 (in the form of a script, an ActiveX control, or native code) to facilitate the client side operations. Incoming connections are received at a reverse proxy/load balancer 1206 (implemented, for example, via Pound) that provides a front end to the site's image transformation application engine 1208. In this embodiment, the image transformation application engine 1208 is implemented as a pair of image manipulator front end (IMFE) processes 1208a and 1208b, each of which preferably has an associated cache 1210a and 1210b, respectively. There may be additional IMFE process instances. Preferably, a given IMFE process 1208 caches files in its associated cache 1210. The image transformation application engine 1208 preferably is distinct from a filesystem 1212 that comprises a number of distinct processes, namely, a set of one or more filesystem front ends 1214a ... 1214n, and a set of one or more filesystem back ends 1216a ... 1216n. The filesystem back end processes provide access to a database 1218 in which user- or third party-supplied photos (and/or other content) are stored. This separation of image transformation and image storage provides significant advantages in that one or more variants (namely, the transformations) of a given photo need not be persistently stored (i.e., in the database); rather, only the image itself needs to be stored in the database. The transformations are created as needed "on the fly" and preferably saved only to the IMFE cache. Moreover, preferably the filesystem 1212 just handles files, while security settings are enforced to ensure that images do not get served directly from the filesystem itself.

The initial layout and reflow algorithms described above also are implemented in the application server layer.

According to a feature of the present invention, when a story is written to HTML (i.e., as the web page exported to the client browser), preferably each photo of the story is associated with an image tag <IMG>, and the SRC attribute of that tag preferably has a given URL. In particular, the URL is of the form:

http://<imfe>/x-fetch/<image hash>.<ext>?PARAMLIST

As can be seen, and with reference to FIG. 12, the URL points to the image transformation application (in particular, the IMFE process), and it also includes (i) an "image hash" that is a unique identifier for the photo, and (ii) a list of parameters that describe one or more image transformations. Thus, a portion of the URL itself functions as an application programming interface (API) to the image transformation engine. As will be seen, by incorporating image transformations within the URL itself (and by separating the transformation engine from the database storage via the filesystem), the system can perform image manipulations directly at the entry to or exit from the site (i.e., as photos are received in or served from the site). As noted above, this feature obviates storage of multiple versions of a given photo, which significant reduces storage cost.

Although not required, preferably the image hash is used as a content addressable storage (CAS) identifier so that the location of the image (in the database) is a function of the hash. Any other convenient indexing scheme may be used instead.

Image Transformation URL API

As noted above, the client-side image transformations are varied and include, without limitation, one or more of the following: scaling, sizing, cropping, zoom, rotation, sharpening, effects, and others. A transformation typically is effected by an end user taking a given user interface action on the client side (e.g., clicking on a photo, selecting an editing tool, and performing an edit). The following is a representative list of some URL API parameters and their associated image transformation:

against=<old xform id>: apply the new edit to the old transform id—this is useful for doing a series of transformations without having to calculate the new transformation against the true original fit=<x>x<y>: "fit" an image to a mold of any positive integer x and y dimension; e.g. fit=100x200 takes an image and fits it into a mold that is 100 wide and 200 high (pixels)

let the original image scale be 1; define the transformation scale by taking the *greater* of (new x/orig x) and (new y/orig y), and let that be the scale;

if the transformation scale is less than 0.90: scale the image by new d/orig d, then center weight crop the image to the new *aspect ratio* if the transformation scale is greater than or equal to 0.90: center weight crop the image to the new image size if an image is specified to fit a mold that is *bigger* than the image in some dimension, then the image is superimposed on a white canvas of the mold size fitfactor=<x>: zoom in on an image fitting window, 0.0+−8.0 fitnocrop=1: this parameter instructs the engine to fit the image, but not to crop it.

crop=<x>,<y>x<x>,<y>: e.g. crop=0.1, 0.1x0.9, 0.9: this crops the image as defined by the top left point, which preferably is specified as being 10% from the left edge x, and 10% from the top edge y, and the bottom right point, which preferably is specified as being 90% from the left edge x, and 90% from the top edge y rotate=<degrees>: rotate an image any positive integer number of degrees from 0 to 360; rotations are defined to be clockwise scale=<s>: scale this image by a uniform factor of s (e.g., range: 0.0+ to 8.0)

setw=<w>: set the width of this image to w pixels seth=<h>: set the height of this image to h pixels get=dimensions: this returns the x and y dimensions for this image xform=bw: this causes the image to be rendered black and white (greyscale)

xform=neg: get the negative of the image xform=sepia dropshadowbg=cccccc: this uses a colored background for a dropshadow border=<w>: this causes the image to be surrounded by a border of w pixels; the image will be 2w wider and taller cookiestate=on: send this parameter to enable the state saving xform cookie for this image on this request; this defaults to off filetype=jpg: manually set the image return type nosharpen=1: do not perform automatic image sharpening color_profile=preserve: do not strip the outgoing image of jpeg exif headers or color profile information colorspace=cmyk: output this image as a CMYK image if at all possible (currently uses a default CMYK color profile and the embedded one from the jpg or tiff if present)

For HTTP GET calls, the API returns an image, and a cookie. For transformation calls, the API returns an image, transformed as requested, and (if cookiestate=on) a cookie called 'fileid' whose value is: <filename>,<some number>. Future requests to the transform API send this value if subsequent operations are to be based on a last operation done, rather than on the original file.

Image Security

The filesystem 1212 is distinct from the transformation application engine and preferably just handles files. View-item security is implemented in the application layer to ensure that images with security settings do not get served directly out of the filesystem. This resource locking is accomplished as follows, and with reference to the URL format described above. First, direct fetching from the filesystem is disabled by requiring that the x-fetch method use a secret user-agent header that does not circulate outside of the infrastructure. Second, with respect to the image retrieval URLs, preferably every request to x-fetch requires two (2) parameters: timestamp, and token. If either parameter is missing, the IMFE process declines the request. The timestamp is the seconds since the epoch, and it is considered to be valid for only a given time period, e.g., one (1) hour. Thus, e.g., if the timestamp describes a time that the IMFE considers longer than an hour in the past, IMFE declines the request. The token preferably is an MD5 hash that ensures the timestamp was not tampered with. In a representative embodiment, the md5 hash is defined as:

md5_hex(image_id+timestamp+secret)
    e.g. md5_hex("012023402340ffe.jpg1234010391ab . . . 567098")

If the token parameter does not match this calculation, preferably the IMFE declines the request, as previously noted.

In addition to the above, the security API preferably allows permalinks to be created as endpoints. Thus, for example, the end user may create an endpoint called "user-image." Now, suppose the user desires a link to a public picture called 0aaabbbaaa5555123.jpg, which for example is a picture of a dog. The picture is referred to as "dog" in the permalink, and the association is stored. The user is then provided with the following representative link: . . . studio/user-image/<userid>/dog.jpg. The link would then provide the following when hit:

the user is <userid>
with respect to this picture, is it public?
yes, create a NOW valid x-fetch link, and proxy to the IMFE
Or, suppose the link is private:
the user is <userid>
with respect to this picture, is it public?
no, is it completely private, or is it set to contact privacy?
is the user in question logged into the site?
no, redirect the user to the login page to log in, with a follow-up url of */studio/user-image/<userid>/dog.jpg
is the user logged in? if still no, repeat
if yes, is this user on the publicity list for this picture? (i.e., is this user <userid> if private, or in the contact list permissions for this picture if set to contact privacy?)
if yes, create a NOW valid x-fetch link, and proxy to the IMFE
if no, return an HTTP 404

Filesystem

Figure 13:
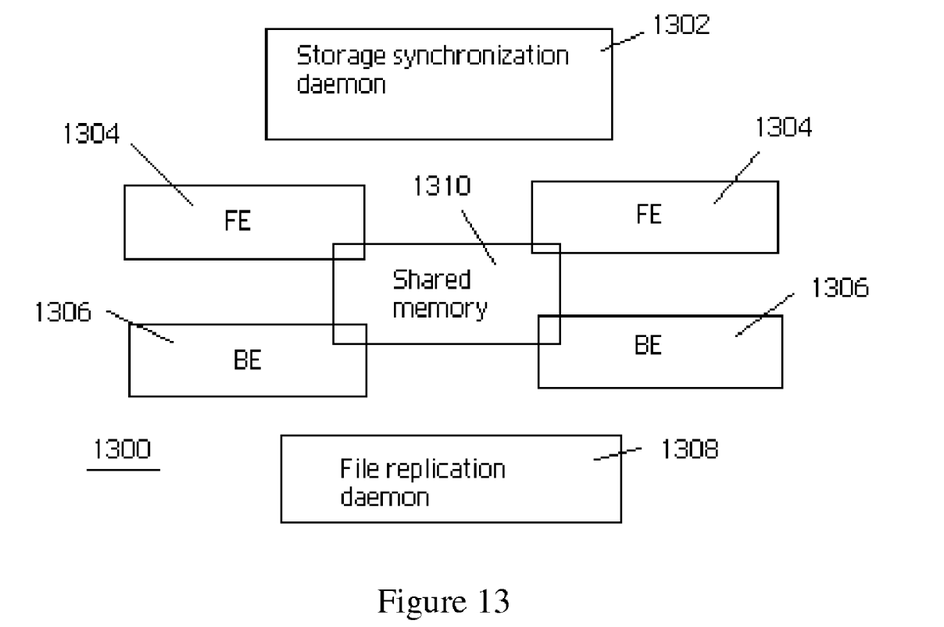
FIG. 13 illustrates the filesystem in more detail.

The filesystem is implemented in a distributed manner, e.g., across a set of Intel processor (or equivalent)-based Linux (or equivalent)-based server machines that are connected in a local area network, or in any other convenient manner. The filesystem front end processes 1214 and the back end processes 1216 shown in FIG. 12 run on these machines. FIG. 13 illustrates an embodiment of the filesystem in more detail. The filesystem 1300 comprises a storage synchronization daemon 1302, one or more of the front end (FE) modules 1304 (running as Apache modules), one or more of the back end (BE) modules 1306 (running as Apache modules), and a file replication daemon 1308. The synchronization daemon 1302 preferably executes in both FE and BE machines, and the file replication daemon 1308 typically runs on the BE machines. Although the drawing illustrates separate FE and BE machines, this is not a requirement, as FE and BE modules may execute on the same machine. As also seen in FIG. 13, preferably each FE and BE machine supports a shared memory segment 1310 that is maintained by the daemon 1302 and the FE module 1304. The daemon 1302 wakes up, and then checks a set of hosts that are configured into the filesystem to determine their status.

The FE module 1304 provides the basic connectivity to the BE modules and handles file read and write operations for the filesystem. A startup sequence for the FE module begins by reading and storing configuration options, and then determining which back end hosts are reachable.

The following illustrates how an FE module 1304 responds to a file publish (POST or PUT) operation:

parse client request for required data fields
  format of the request for POSTs is:
    POST/<put|post|a-put|a-post>-<source>/<userid>/<timestamp>/<htimestamp> HTTP/1.1
if required field not present, return HTTP 404
ensure the userid is consistent with the user hash
if not, return HTTP 404
ensure request is within the timestamp window, and that the timestamp hash has not been tampered with
if tampered or outside window, return HTTP 404
acquire back end host
if no host, return HTTP 404
modify request URI so it conforms to an internal filesystem API
proxy modified request to acquired host
read response
!! if the response is success, and the a-<method> names were used in the URI:
  form an HTTP request for the application server that inserts the username, returned file hash ID (filename), and any other metadata returned by the internal API for a successful response (if it is a new file)
else return HTTP 404

The following illustrates how an FE module 1304 responds to a file retrieval (GET) operation:

parse URL for the filename
ask a Real File DB what hosts this file is stored on
if none, return HTTP 404
query the shared memory store and build a list of the hosts that are alive and that have this file
pick a random one and connect
if fail, mark the host as DOWN_UNK in shared memory, and pick another one
if HTTP 404, delete this file row from the Real File DB, pick another one and try again
if run out, no host
if no host, return HTTP 404
use the internal API to make a file request (GET), and proxy the response to the requesting client A startup sequence for a back end (BE) module 1306 begins by reading configuration options. The module then uses the internal API to announce itself by IP address to an identified primary and secondary FE.

The following illustrates how a BE module 1306 responds to a file publish (PUT or POST) operation:

parse client request for the required data field, filename
if required field not present, return HTTP 404
read a Disks file
pick a disk at random
read that disk's Free file
if Free <given %, pick another (a minimum percent threshold can be configured with an environment variable)
if no disks, return DISK_FULL
open a file on disk called <disk>/tmp/<last digit of timestamp>/<last digit of pid>/<timestamp>-<pid>-<origfilename>
write the file, calculating the file's MD5 hash
close the file
execute an atomic cmd:
  mv <tmpfile><disk>/<1st 2 hashchar>/<2nd 2 hashchar>/<hashcode>.<ext> write a line into the Real File DB table; if fail, return DB_ERROR write a line into the Temp File DB table; if fail, return DB_ERROR update the <disk>/free file return an OK response The following illustrates how a BE module 1306 responds to a file retrieval (GET) operation is:

parse URL for the filename open file, and pipe file contents as a response; if no file, return HTTP 404

The file replication daemon 1308 runs on back end machines and operates to ensure that every file in the Real File DB has <Copies> copies. It also ensures that, if a disk goes down, a process of re-replicating the lost files begins.

Although the present invention has been described primarily in the context of creating and publishing online stories, this is not a limitation of the invention. A given story may be published to a product, such as a book, a postcard, a single page poster, a multi-page poster), and other items. In such case, preferably the site includes one or more additional display screens by which the story is adapted for a particular product-based format. Thus, for example, if the end user desires that the story be published in the form of a gift book or the like, the interface may include additional display screens, e.g., to enable the end user to design individual pages, to interact with a third party publishing system, and the like. Of course, although not described in detail, one of ordinary skill in the art will appreciate that the inventive system may interact with one or more e-commerce, payment, manufacture, promotion, and distribution systems as required. One of more of such components may be performed natively, or through web-based or other interaction with third party systems.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The invention can take the form of an entirely hardware embodiment, an entirely software embodiment, or an embodiment containing both hardware and software elements. In one preferred embodiment, the initial layout and reflow algorithms are implemented in software executing in one or more server machines. The invention (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As noted above, preferably the client-side interface is dynamic and affords end users with significant creative control over how their photos are displayed and integrated with text to create their customized visual stories. Although not required, the interface is conveniently enabled using AJAX (Asynchronous Javascript and XML), which are a known set of web development techniques that enhance the web page's interactivity, speed and usability. AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

While given components of the system have been described separately, one of ordinary skill will appreciate that some of the functions may be combined or shared in given instructions, program sequences, code portions, and the like.

Having described our invention, what we now claim is as follows.

The invention claimed is:

1. A method, operative in an Internet-accessible system comprising a front end application for processing requests associated with user-supplied images, a data store for storing user-supplied images, and a filesystem, the method comprising:

inhibiting direct access to the user-supplied images by using a secret header in requests to the file system for the user-supplied images, such that any request that does not include the secret header is refused;

upon receipt of given request data including the secret header and associated with an end user interface gesture associated with a given image, the given request data including a timestamp and a token:

determining whether the timestamp is associated with a time window in which access to the given image is permitted;

if the timestamp is associated with the time window, using the token to determine whether the timestamp has been tampered with;

if the timestamp is associated with the time window and has not been tampered with, forwarding the request to the front end application.

2. The method as described in claim 1 wherein direct access is inhibiting by requiring the given request data to include a secret.

3. The method as described in claim 2 wherein the token is a given function of at least the timestamp and the secret.

4. The method as described in claim 2 wherein the token is a given function of an identifier for the given image, the timestamp and the secret.

5. The method as described in claim 4 wherein the given function is an MD5 hash.

6. The method as described in claim 2 wherein the secret is associated with a given user agent header.

7. The method as described in claim 1 further including:

serving to an Internet-accessible device a markup language page in which a set of images are positionable, wherein the markup language page is structured according to a layout grid that maintains a first user-defined ordering of the set of images, wherein the page markup includes at least one image URL, the image URL including a fetch command that includes the timestamp and the token in the given request data.

8. The method as described in claim 1 wherein if either the timestamp is not associated with the time window or has been tampered with, serving a given response.

9. The method as described in claim 8 wherein the given response denies access to the given image in the data store.

10. An Internet-accessible system comprising;
   a first process tangibly embodying computer program instructions executable by a processor for serving markup language pages, wherein at least one markup language page includes a set of images, wherein the markup language page is structured according to a layout grid that maintains a user-defined ordering of the set of images, and wherein the page markup includes at least one image URL, the image URL including a fetch command;
   a second process tangibly embodying computer program instructions executable by a processor for carrying out a method that includes:
      upon a given occurrence, receiving given request data that includes the fetch command, the fetch command having associated therewith a timestamp and a token:
         determining whether the timestamp is associated with a time window in which access to the given image is permitted;
         if the timestamp is associated with the time window, using the token to determine whether the timestamp has been tampered with;
         if the timestamp is associated with the time window and has not been tampered with, accepting the request;
         if either the timestamp is not associated with the time window or has been tampered with, denying the request; and,
   a third process to inhibit direct access to the set of images by using a secret header in requests to a file system for the set of images, such that any request that does not include the secret header is refused.

11. The Internet-accessible system as described in claim 10 further including an image transformation application that processes requests associated with user-supplied images.

12. The Internet-accessible system as described in claim 11 wherein the request, if accepted, is forwarded to the image transformation application for handling.

13. The Internet-accessible system as described in claim 10 further including a data store in which the set of images are stored.

14. The Internet-accessible system as described in claim 11 further including a cache associated with image transformation application for temporarily storing data generated during a given image transformation operation.

* * * * *